United States Patent [19]

Palmer et al.

[11] 3,999,871

[45] Dec. 28, 1976

[54] PLASTICS JOINT

[75] Inventors: John P. Palmer, Reading; Stephen W. Isbister, Maidenhead; John D. F. Elvin, Hillingdon, all of England

[73] Assignee: ITW Limited, Slough, England

[22] Filed: June 17, 1975

[21] Appl. No.: 587,795

[30] Foreign Application Priority Data
June 19, 1974 United Kingdom ............ 27129/74

[52] U.S. Cl. .................................. 403/71; 403/84; 296/97 K
[51] Int. Cl.² .......................................... B60J 3/00
[58] Field of Search ............ 403/103, 84, 97, 359, 403/71; 296/97 K, 97 R

[56] References Cited
UNITED STATES PATENTS

| | | | |
|---|---|---|---|
| 604,389 | 5/1898 | Hamilton, Jr. | 403/84 |
| 1,381,805 | 6/1921 | Crewdson | 403/359 |
| 2,691,899 | 10/1954 | Brown | 403/359 |
| 3,227,985 | 1/1966 | Hardison et al. | 403/359 X |
| 3,317,225 | 5/1967 | Cooper | 296/97 R |
| 3,330,594 | 7/1967 | Cadle | 403/97 X |
| 3,360,296 | 12/1967 | Hatch | 296/97 R |
| 3,532,369 | 10/1970 | Reilly | 403/176 |
| 3,722,929 | 3/1973 | Gilman | 403/359 |

Primary Examiner—Andrew V. Kundrat
Attorney, Agent, or Firm—Robert W. Beart; J. R. Halvorsen

[57] ABSTRACT

A pivotal mounting, especially for an automobile sun visor, comprising a one-piece plastics sleeve having a generally cylindrical bore, the radially inner surface of which, when viewed along the axis, has a first number of radial undulations spaced around its circumference, in combination with a generally cylindrical member which is a one-piece plastics moulding and lies substantially coaxially within the bore, the radially outer surface of the member, when viewed along the axis, having a second number of radial undulations spaced around its circumference, both numbers being greater in value than one, and being different, the arrangement being such that each set of said undulations can register firmly with the other at a third number of relative angular positions of the sleeve and the member, the third number being greater than the first and second numbers.

13 Claims, 7 Drawing Figures

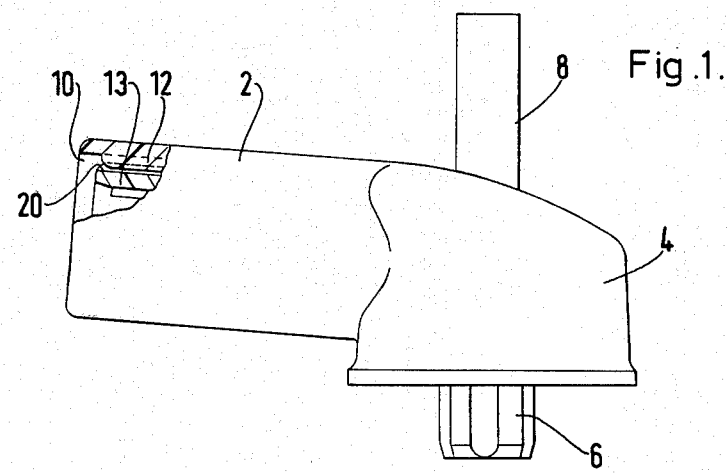
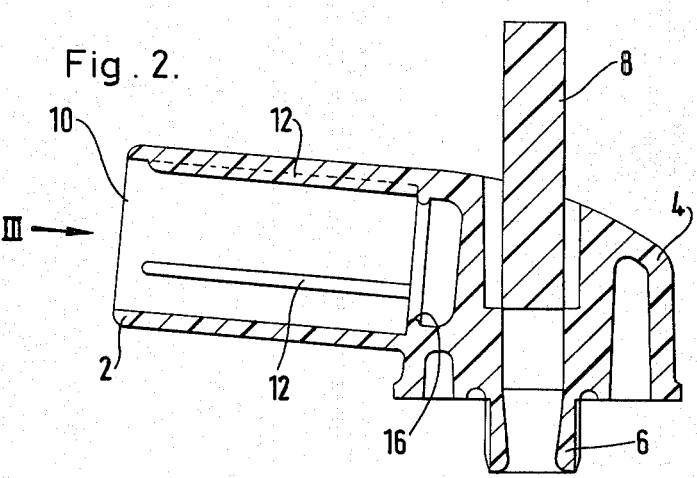
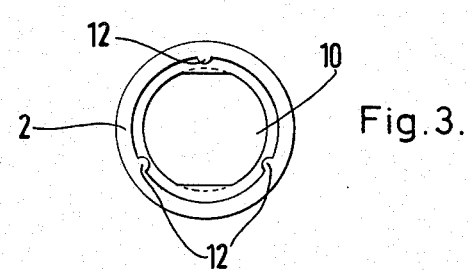

PLASTICS JOINT

This invention concerns a pivotal mounting. A well known example of such a mounting occurs on the sun visor of an automobile. The visor has a panel mounted on an arm, the end of which is mounted to a bracket on the body of the automobile. The visor panel has to be rotatable downwards to lie at a chosen angular position to shield the driver's eyes from sunlight. The angular position has to be held firmly despite vibration of the automobile during movement, which tends to shake the panel to a lower angular position obstructing the driver's vision. The mounting also has to hold the panel at its upper retracted position. However, the panel has to be manually movable between the various angular positions, being moved by one hand whilst driving.

According to the present invention a pivotal mounting comprises a one-piece plastics sleeve having a generally cylindrical bore, the radially inner surface of which, when viewed along the axis, has a first number of radial undulations spaced around its circumference, in combination with a generally cylindrical member which is a one-piece plastics moulding and lies substantially coaxially within the bore, the radially outer surface of the member, when viewed along the axis, having a second number of radial undulations spaced around its circumference, both numbers being greater in value than one, and being different, the arrangement being such that each set of said undulations can register firmly with the other at a third number of relative angular positions of the sleeve and the member, the third number being greater than the first and second numbers.

In a preferred mounting embodying this invention, the sleeve has three longitudinally extending ribs spaced uniformly around its inner surface, and the member has sixteen longitudinally extending and uniformly spaced grooves of a shape which is accurately complementary with that of each rib. Between the grooves are "flats," which are in fact portions of the cylindrical radially outer surface of the member.

The accompanying drawings illustrate this preferred mounting, and two modifications thereof, by way of example only. In these drawings:

FIG. 1 is side elevation of the mounting, with part broken away;

FIG. 2 is a central section through the sleeve component, looking in the same direction as FIG. 1;

FIG. 3 is a view looking in the direction of the arrow III in FIG. 2;

Figure 4:
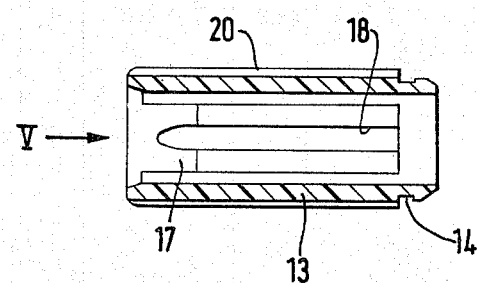
FIG. 4 is a central section through the member.

As shown in FIGS. 1 and 2, a sleeve 2 is part of a component which also includes a body 4 and a fastener 6. The entire component is an integral moulding of nylon 6. In use, the fastener 6 is inserted into an opening in a metal panel, and is then secured by axial shifting of a drive pin 8.

The interior of the sleeve 2 has a generally cylindrical bore 10, in which are three protuberances in the form of longitudinally extending ribs 12, which are uniformly circumferentially spaced, and each of which is substantially semi-circular in cross section, as shown in FIG. 3.

A generally cylindrical member 13, which is a one-piece plastics moulding, co-operates with the sleeve 2 and lies coaxially wholly within it, its position when assembled being apparent from the broken away portion of FIG. 1. At its righthand end, the member 13 has a circumferential groove 14 which makes snap engagement with a circumferential projection 16 within the bore of the sleeve 2. The member 13 itself has an internal bore 17, intended to receive a terminal portion of a rod (not shown) carrying a sun visor. The terminal portion of the rod is cylindrical, with a flat on one side, and the bore has a corresponding shape, as is apparent in FIG. 5. Along the centre of the flat there is a groove 18, the purpose of which is to accommodate any flash on the rod, which in practice is of a plastics material, made by moulding in a two-part mould.

Figure 5:
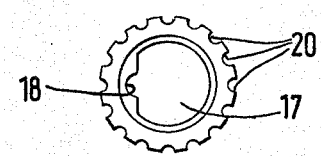
FIG. 5 is an end elevation of the member looking in the direction of the arrow V in FIG. 4.

Around the exterior of the member 13 there are sixteen longitudinally-extending grooves 20. These grooves are uniformly circumferentially spaced, and of substantially semi-circular cross section, as shown in FIG. 5. The width of each groove subtends about 10°, and the angular interval from the centre of one groove to the next is 22½°. If the member is rotated relatively to the sleeve, by applying torque to the sun visor, the member and sleeve pass through a succession of positions of firm registration, these positions being spaced from one another at angular intervals of 7½°. In one typical position of firm registration, one rib 12 is registering with one groove 20, a second rib rests on a flat between two of the grooves 20, and is a third of the way from one groove to the next, whereas the third rib is two-thirds of the way from one groove to the next. After turning through 7½°, the second rib registers in a groove, while the first and the third ribs are resting on flats, while after a further 7½° turning, the third rib rests in a groove. After a further 7½°, the first rib rests in the groove next to that in which it previously rested, and so on. In theory, therefore, there are a total of 48 different positions of firm registration.

In this particular example the cylindrical surfaces of the interior of the sleeve and of the exterior of the member are about 11.5mm diameter. The proportions are such that the ribs 12 are all always in firm contact with the member 13, and there is slight "out of round" distortion of the sleeve 2, and possibly also of the member 13.

The reader will appreciate that the three ribs (a first number), and the 16 grooves (a second number), respectively constitute two sets of radial undulations according to the present invention. Each set of said undulations can register firmly with the other at 48 (a third number) relative angular positions of the sleeve 2 and the member 13, the third number being greater than the first and second numbers, which, it should be noted, are both greater in value than one, and are different.

In the example shown in FIGS. 1 to 5, the flat between each groove and the next has an angular width which is greater than the angular spacing between one firm position and the next, and each position of firm registration results from the engagement of an undulation on the sleeve with an undulation of complementary cross section on the member. It is, however, quite possible for the grooves to be wider and the flats to be narrower. In that case, at each position of firm engagement there is one rib located centrally in a groove, and two ribs located in symmetrical positions against opposite sides of two other grooves.

Figure 6:
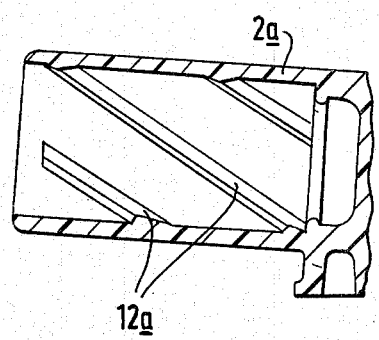
FIG. 6 is a view similar to the lefthand part of FIG. 2, but shows a modification thereof; and, FIG. 7 is a view similar to FIG. 6, but of a further modification.

FIGS. 1 to 5 show a pivotal mounting in which the two sets of undulations are aligned axially with respect to the sleeve 2 and the member 13, but in a modification shown in FIG. 6, a set of ribs 12a is aligned helically with respect to a sleeve 2a. A set of grooves (not shown) is aligned helically, and in the same hand of rotation, with respect to a member (also not shown). Preferably, the hand of rotation is chosen so that longitudinal thrust experienced by the member, during rotation thereof relatively to the sleeve, is directed towards the right as shown, thereby tending to preclude accidental separation. A further advantage of this helical arrangement is that it allows the sleeve and the member to be manufactured to coarser tolerances.

The two sets of undulations may have ratchet-like cross-sections, as shown by the ribs 12a in FIG. 6, whereby rotation of the member relatively to the sleeve is easier in one rotational sense than the other. For a sun visor, it is desirable that the easier sense of rotation be that which tends to move the sun visor out of the driver's vision, i.e., upwards.

Figure 7:
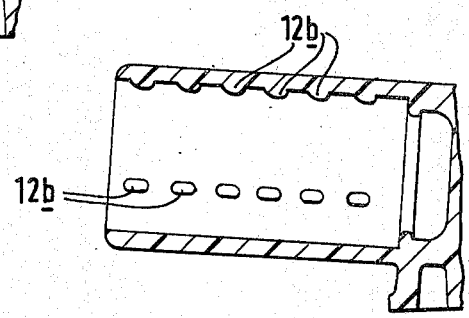

Another modification is shown in FIG. 7, in which the ribs have been replaced by longitudinally separated smoothly curved protuberances 12b. The member to be used in this modified combination can be identical to that described with reference to FIGS. 1 to 5, but is preferably itself modified by replacing the grooves with longitudinally separated smoothly curved depressions (not shown).

In the examples shown, the grooves are uniformly spaced in a circumferential sense, but this is not absolutely necessary. Considering, for example, the case of a sun visor, it may be sufficient to provide for adjustment in small steps through an arcuate range of about 45°, that is provide at least one of the two sets of undulations with a non-uniform circumferential spacing. This means, for example, that some of the grooves shown in FIG. 5 can be omitted. Moreover, with particular reference to the case of a sun visor, which is often required to be located in a fully raised position, the arrangement can be such that the sleeve and the member will co-operate to give even firmer registration at some positions than others. For example, a separate snap-fit catch may be provided, or a particular pair of the undulations may be dimensioned to give an increased frictional inter-engagement.

It should be noted that the grooves may constitute the smaller number of undulations, rather than the ribs, and that this smaller number could be formed on the member rather than the sleeve.

We claim:
1. A pivotal mounting comprising a resilient one-piece plastics sleeve having a generally cylindrical bore, the radially inner surface of which, when viewed along the axis, has a first number of radial undulations spaced around its circumference, in combination with a generally cylindrical member which is a one-piece plastics moulding and lies substantially coaxially within the bore, said cylindrical member also including a bore having means for nonrotatably accepting a substantially rigid rod, the radially outer surface of the member, when viewed along the axis, having a second number of radial undulations spaced around its circumference, both numbers being greater in value than one, and being different, the arrangement being such that each set of said undulations can register firmly with the other at a third number of relative angular positions of the sleeve and the member, the third number being greater than the first and second numbers, each position of firm registration results from the engagement of an undulation on the sleeve with an undulation of complementary cross-section on the member, and the inner cylindrical surface of the sleeve and the outer surfaces of the member are proportioned such that those undulations of the sleeve which are not in firm registration with an undulation of said member results in a generally radial out of round distortion of said resilient sleeve and means for mounting said sleeve to a supporting apertured workpiece.

2. A pivotal mounting according to claim 1, in which the two sets of undulations are aligned axially with respect to the sleeve and the member.

3. A pivotal mounting according to claim 1, in which the two sets of undulations are aligned helically with respect to the sleeve and the member.

4. A pivotal mounting according to claim 1, in which the member is axially restrained by a snap-fit within the sleeve.

5. A pivotal mounting according to claim 1, wherein said rod projects from an automobile sun visor.

6. A pivotal mounting according to claim 1, in which the undulations of at least one of the two sets of undulations are not uniformly spaced in a circumferential sense.

7. A pivotal mounting according to claim 1, in which the undulations of at least one of the two sets of undulations have ratchet-like cross-sections, with a ramp on one side and an abrupt shoulder-like means on the other side, whereby rotation of the member relatively to the sleeve is easier in one rotational sense than the other.

8. A pivotal mounting according to claim 1, in which the sleeve and the member can co-operate to give even firmer registration at some positions than others.

9. A pivotal mounting according to claim 1, in which the two sets of undulations are formed as longitudinally extending ribs and grooves respectively.

10. A pivotal mounting according to claim 9, in which the ribs are formed on the sleeve.

11. A pivotal mounting according to claim 9, in which there are three ribs and sixteen grooves which can inter-engage to provide forty-eight different positions of firm registration.

12. A pivotal mounting according to claim 9, wherein said ribs are defined by longitudinally separated smoothly curved protuberances.

13. A pivotal mounting according to claim 12, wherein the grooves are defined by longitudinally separated smoothly curved depressions.

* * * * *